United States Patent [19]
Carnaggio et al.

[11] Patent Number: 5,559,754
[45] Date of Patent: Sep. 24, 1996

[54] SEDIMENT CLASSIFICATION SYSTEM

[75] Inventors: Frank S. Carnaggio, Slidell; Douglas N. Lambert, Pearl River, both of La.; David C. Young, Long Beach, Miss.

[73] Assignee: The United States of America as represented by the Secretary of the Navy, Washington, D.C.

[21] Appl. No.: 227,640

[22] Filed: Apr. 14, 1994

[51] Int. Cl.$^6$ .................................................. G01V 1/38
[52] U.S. Cl. .............................. 367/15; 367/21; 181/110; 73/170.32
[58] Field of Search ....................... 367/15, 21; 181/110; 73/170.32, 170.33

[56] References Cited

U.S. PATENT DOCUMENTS

| | | | |
|---|---|---|---|
| 3,478,308 | 11/1969 | Stanley et al. | 367/21 |
| 4,353,121 | 10/1982 | Ray et al. | 367/21 |
| 4,796,238 | 1/1989 | Bourgeois et al. | 367/87 |
| 5,193,077 | 3/1993 | Weiglein et al. | 367/23 |

Primary Examiner—J. Woodrow Eldred
Attorney, Agent, or Firm—Thomas E. McDonnell; Edward F. Miles

[57] ABSTRACT

A computer driven system which receives time-binned echo strength data, and which, for each series of echo strengths received, stores the echo strength data in computer memory, and automatically associates with that data the latitude, longitude and time at which the data were generated. From these data, the algorithm classifies the sediments, which produced the echo strengths, determining such parameters as sediment acoustic impedance, porosity, attenuation, grain size, density, acoustic velocity, and shear strength. System software can produce additional result files in which these properties are associated with corresponding echo strength data. Both the raw and reduced data are displayable in human readable form, preferably on a computer monitor, for operator review. System software can also generate navigation plots which trace on a map, preferably on computer monitor, points at which data are taken, and the bottom sediment at those points. System software, in conjunction with standard computer graphics packages, can display the data in all these files, both after the fact and in near real time for operator review.

20 Claims, 6 Drawing Sheets
(1 of 6 Drawings in Color)

SEDIMENT CLASSIFICATION SYSTEM

BACKGROUND OF THE INVENTION

Since June of 1985, the Naval Research Laboratory has been testing and developing a normal incidence, narrow beamwidth, high resolution seismic system that, when combined with a well designed and verified software package, can have the capability to accurately predict, in near real-time, acoustic impedance, sediment type, and a number of selected geotechnical properties of the upper several meters of the seafloor while in an underway survey mode. The system under test was, until recently, based on the Echo Strength Measuring System developed in the early 1980's by Honeywell ELAC of Kiel, Germany. A description of the ELAC system is found in D. N. Lambert, *An Evaluation of the Honeywell ELAC Computerized Sediment Classificadon System,* (Naval Ocean Research and Development Activity Report 169, August 1988). The original ELAC system consisted of a narrow beam, 15 kHz transducer, a high resolution analog paper recorder, and an 8085 microprocessor-controlled signal processor that quantitatively measured the return echo strength in ten adjustable time windows that correspond to depth intervals in the sediment. Either the first five or the last five of these echo strength lines were plotted on a paper seismogram. The relative spread of the lines away from a baseline indicated the strength of the echo return in each of the time windows. Wide separation between the lines denotes a strong acoustic return and a highly reflective sediment such as sand. Narrow separation between the lines indicates low reflectivity or soft muddy sediments. An experienced operator could subjectively predict the type of sediment below the transducer fairly well using this method. In order to quantify the acoustic return, ELAC, responsive to the Naval Research Laboratory, developed a near real time software program that computes an acoustic impedance profile of the sediment for each acoustic ping, using standard acoustic sediment theory as set out in C. S. Clay and H. Medwin, ACOUSTICAL OCEANOGRAPHY (John Wiley & Sons, 1977). From the acoustic impedance profile, several empirical relationships, developed by Hamilton, could be used to predict a number of sediment geotechnical properties in near real time while in a survey mode. See, e.g., E. L. Hamilton, *Geoacoustic Modeling of the Sea Floor,* 68 J. Acoustic Soc. Am. 1313 (No. 5, Nov. 1980). The software for that system was designed to provide a research tool, with broad capabilities that allowed the updating of Hamilton-type software databases as user knowledge improved. The system was difficult to operate and relatively user unfriendly. It was intended as a research tool, but was never intended to operate, nor could it operate, as a routine mapping or survey instrument. Its output, being a series of raw echo strengths, could not be readily, much less directly, correlated to ship position, or any of a number of other data needed for surveying. A strong need exists to have an easily operable, nearly automated, remote seafloor classification system that can routinely produce seafloor property maps for a multitude of applications.

SUMMARY OF THE INVENTION

Accordingly, an object of the invention is to provide a system useful for surveying marine sediments, and classifying those sediments to depth.

Another object is to permit such a system to be substantially fully automated.

Another object is to permit such a system to be relatively quick and easy to use.

Another object is to permit near real time display of generated and reduced data in human readable form, to permit "on the fly" operator adjustment of the system.

Another object is that the raw data generated by the system shall have associated with it information permitting ready conversion of the data into maps or plots.

Another object is that the data output by such a system shall be in a form readily convertible to computer generated maps and plots.

In accordance with these and other objects made apparent hereinafter, the invention concerns a computer driven system which receives time-binned echo strength data, and which, for each series of echo strengths received, stores the echo strength data in computer readable memory, and automatically associates with that data the latitude, longitude and time at which the data were generated. From these data, the software classifies the sediments, which produced the echo strengths, determining such parameters as sediment acoustic impedance, porosity, attenuation, grain size, density, acoustic velocity, and shear strength. System software can produce additional result files in which these properties are associated with corresponding echo strength data. Both the raw and reduced data are displayable in human readable form, preferably on a computer monitor, for operator review. System software can also generate navigation plots which trace on a map, preferably on computer monitor, points at which data are taken, and the bottom sediment at those points. System software, in conjunction with standard computer graphics packages, can display the data in all these files, both after the fact and in near real time for operator review.

Because this information is displayable in near real time, the operator receives immediate feedback, which can inform of system problems requiring corrections, the presence of buried objects directly below ship, etc. The system being computer driven, data taking is largely automated. This, plus the information appended to the echo strengths, make the system an attractive survey and mapping tool.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

BRIEF DESCRIPTION OF THE DRAWINGS

The file of this patent contains at least one drawing executed in color. Copies of this patent with color drawing will be provided by the Patent and Trademark Office upon request and payment of the necessary fee.

DETAILED DESCRIPTION

Figure 1:
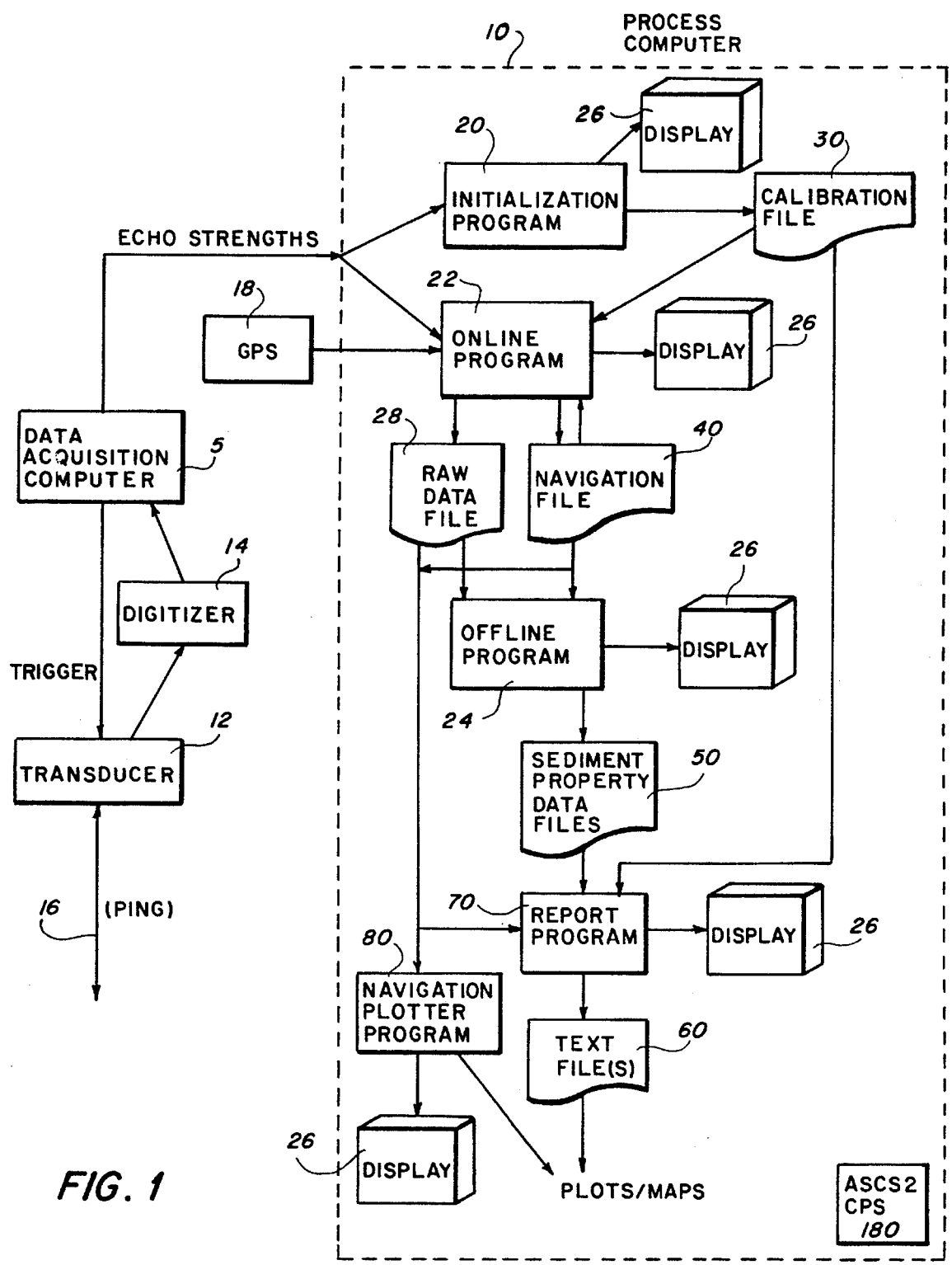
FIG. 1 is a flowchart providing an overview of an embodiment of the invention.

With reference to the drawing Figures, wherein like numerals indicate like parts or steps throughout the several views, FIG. 1 shows in broad outline the major components of an embodiment according to the invention, the arrowed lines of FIG. 1 indicating the direction in which information flows among the components of the system. A data acquisition computer 5 controls external acoustic hardware, the hardware including an acoustic transducer 12 for launching an acoustic pulse (ping) 16 into a water column and receiving echoes of the ping, and digitizer 14 for returning the echoes to computer 5 as digital samples. A sediment classification computer 10 contains a number of software packages which in turn control the acquisition and reduction of acoustic data incoming to computer 5. Initialization program 20 permits an operator to set up the system prior to operation. With software 20 the operator can call up from memory, or create, a calibration file 30, which preferably contains system initialization and calibration data, such as pulse frequency, pulse length, pulse power level, pulse waveform, transducer gain, etc., which the system will use during data taking and reduction. Online software package 22 controls the storage of, and near real time display of, the data generated by the system for operator inspection on computer monitor screen 26.

Data acquisition computer 5 permits an operator to command acoustic transducer 12 to launch acoustic signals (pings) into a water column above a marine sediment of interest, receive back echoes from the sediment, and transduce the echoes into corresponding analog voltages. Digitizer 14 converts the analog signals into corresponding digital samples, and forwards them to computer 5 for processing into proper format and values, and thence to computer 10 where a software package 22 stores them in raw data files 28. Software package 22, called the "online program" because it acts on echo data as it is received, also reads latitude and longitude from Global Positioning System (GPS) interface 18, and appends the data to the echo samples in raw data file 28, along with the time at which the signal was received. The time is read from either a clock internal to computer 10 (not shown), or preferably from the time received from the GPS 18. As echo data accumulates in raw data file 28, the online package 22 processes it for near real time display on computer monitor 26 so that the system operator can get an idea of how well the system is operating, and the nature of the data being collected. Online 22 also creates a data file 40, called a navigation file, which records, for each ping, the date, time, and latitude and longitude, accuracy of the GPS signal, and a prediction of the composition of the topmost sediment layer beneath the water column, i.e. the layer at the water-sediment interface.

Offline software package 24 can take raw data file 28 and/or navigation file 40 and reprocess the data into a number of other reports and plots, more about which below. Although illustrated in FIG. 1 as part of the software in process computer 10, software 24 can be run in a separate computer for convenience. Computer 10 preferably is programmed to read raw data 28 and navigation data 40 in parallel onto peripheral storage media, such as optical disks or Bernoulli disks (not shown), for ready transfer of data for use at remote computers. Computers 5 and 10 themselves are preferably common personal computers, which can readily and conveniently be taken aboard ship and set up and run there easily. The computers preferably have 80486 based micro processors or better, with an MS-DOS operating system, which permits one to run the software quickly and efficiently, permits them to run the algorithms of the software programs disclosed herein in near real time, and to do so with computers which are readily available and relatively inexpensive. This, however, does not preclude the use of more sophisticated computers with parallel processing capabilities.

Figure 2:
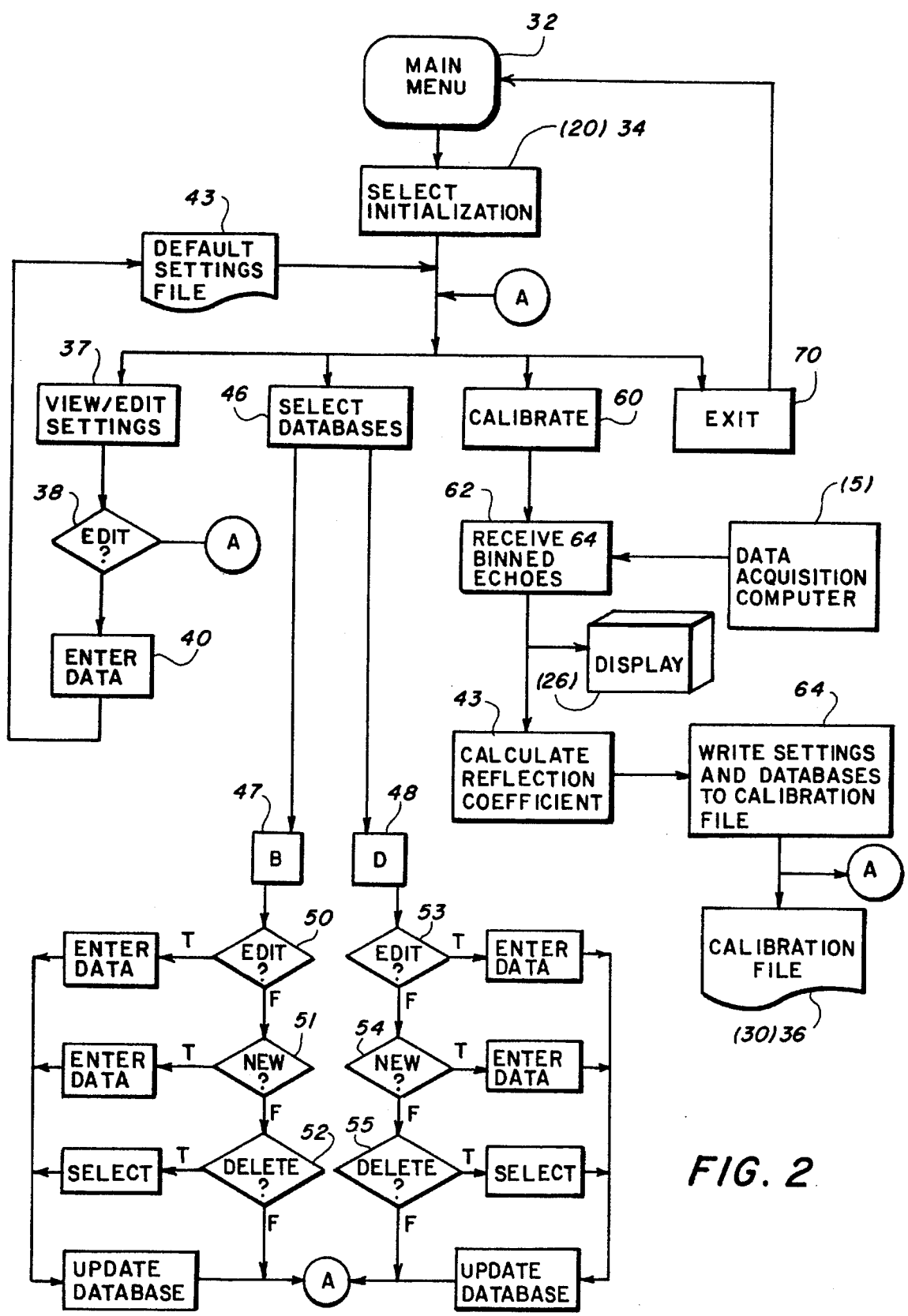
FIG. 2 is a flowchart illustrating initialization of the embodiment, prior to data taking.

With particular reference to FIGS. 1–2, in order to commence operation of the system, an operator would begin running the system software in computer 10, in response to which would preferably appear a main system menu 32, which has as its selectable options the major software packages of the system, of which initialization package 20 is one. After choosing the initiation software 20, the operator can select view and/or edit device settings (37) (e.g. transducer 12's gain, pulse length, averaging factor, frequency, etc.), select a database for use in reducing data to be taken (46), or begin software system calibration (60), or exit the program (70). Upon program startup, program 20 reads default device settings file (43). If the operator chooses to edit the device settings, then the new settings become the default, and the settings file is updated (43). These device settings are stored in calibration file 30 (step 36) for use by the online 22 and offline 24 software packages. If the operator selects a database (46), software 20 displays a menu with two selections, (47) and (48). Database B (47) contains look up tables which correlate acoustic impedance to sediment type, an example of one such database being shown in FIG. 5. Database 48 contains look up tables which correlate acoustic impedance to sediment properties (density, velocity, porosity, attenuation, grain size, sound velocity, and shear strength, or other properties), examples of which are shown hereinafter. Upon selecting either of the databases, the operator can view or edit the databases (50, 53), create new databases (51, 54), or delete existing databases (52, 55). The operator then selects the calibration function from the initialization program menu.

These selections made, the operator instructs the data acquisition computer 5 to send out a series of pings (16) from transducer 12. Transducer 12 then receives the echoes from the pings, which are ultimately recorded as digital samples, as discussed above. For each ping, the data acquisition computer 5 groups, or "bins" the samples into a series of sequential time intervals (62) following the ping, and converts the samples in each interval into a digital number representative of echo strength intensity during the interval (e.g. by averaging or integrating the samples in each window to produce integrated or averaged amplitudes). After each ping, software 20 displays the data on the processing computer 10's monitor 26 (step 26 in FIG. 2) in numeric bit weighting form, and graphically in the form of a multichannel (nominally ten) bar graph correlating color to the signal strength in each sediment interval. Preferably, pop-up warning and alarm windows inform the operator of any communication or serial port anomalies. The color bar graph also indicates to the operator the actual signal strength and warns that the signal may be too low or too high (where signal clipping may occur) such that the data stream may be inadequate for the measurements being made. From this, software 20 produces a normalization factor for entering into calibration file 30, which is a used by online software 22, and offline software 24. The normalization factor is simply a scaling factor used to normalize all time series output from data acquisition computer 5 for the system configuration (frequency used, pulse length, power level, gains set, signal beam width, cable length, etc.).

Using the echo strength's magnitude, and conventional acoustic principles, software 20 calculates the bottom sediment's acoustic reflection coefficient. This reflection coefficient is then compared to a reflection coefficient input into the computer by the operator which represents the known reflection coefficient of the bottom sediment over which the data are being collected. The normalization factor is computed from a comparison of these two values and stored. To smooth out transients, and otherwise ensure better data, the normalization factor is preferably calculated based on averaged returns of several pings (e.g. 64 pings), whose echo strengths are averaged across corresponding time bins or "windows."

Upon completion, calibration file (30) is stored within computer 10 for use during real time data acquisition or later reprocessing, and given a unique name. This file may be later edited using the report software 70. This or other calibration files may be used at a later date during data acquisition or reprocessing by simply recalling it from a listing provided by software 22's menu driven screen.

Figure 3:
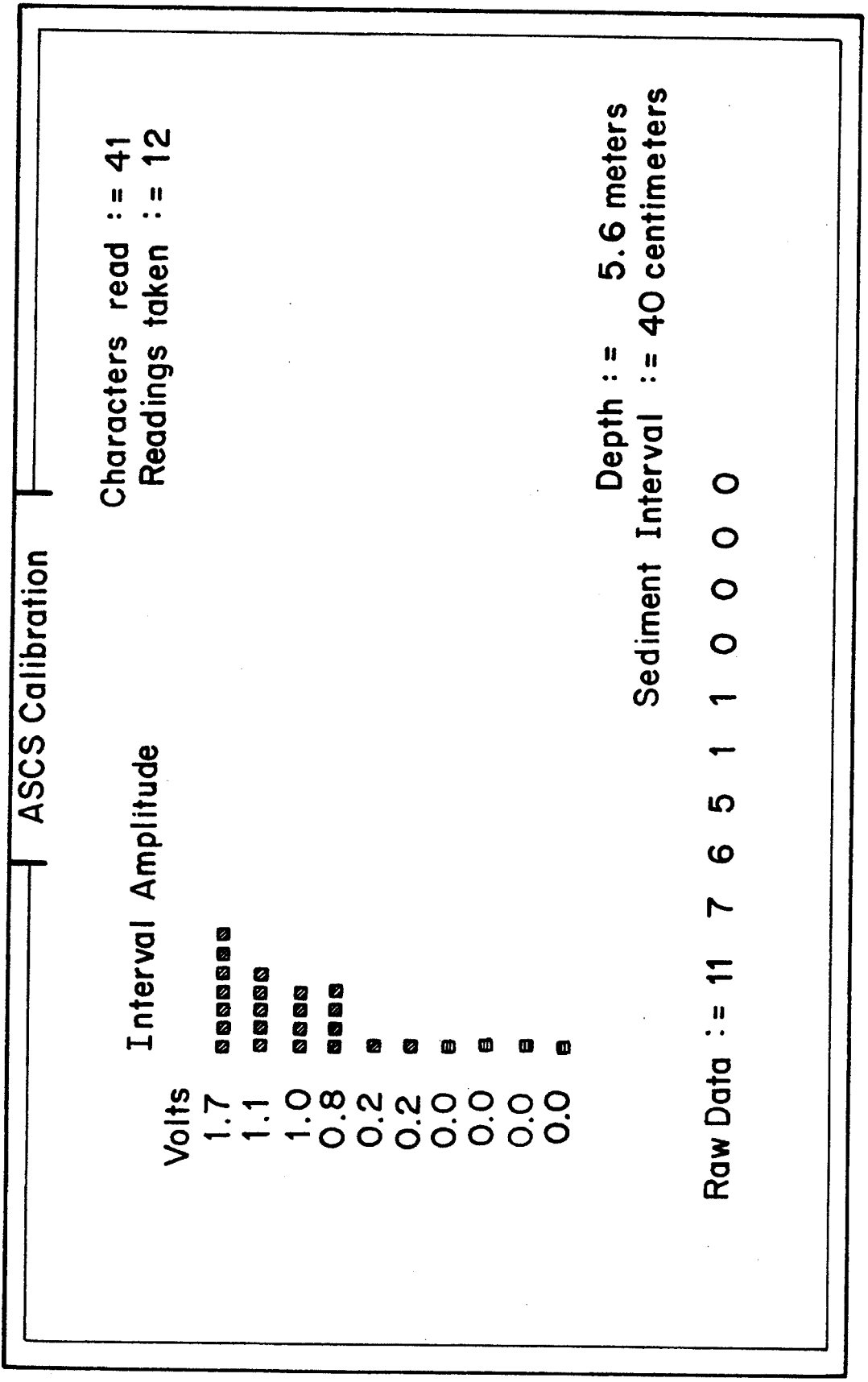
FIG. 3 is a display, such as would preferably occur on a computer monitor screen, which appears during initialization.

While processing the ping, software 20 simultaneously displays the time-binned echo strengths for operator review, preferably on computer monitor 26 in the form of a bar graph, an example of which is shown in FIG. 3. In the upper left hand corner of FIG. 3, in a display headed "Interval Amplitudes," the echo strengths are displayed as a vertically extending array of bars, each bar corresponding to one time interval (increasing time as one proceeds from the top bar to the bottom), and the horizontal length of each bar representing the amplitude of echo strength received in each interval, measured in transducer volts. The topmost bar is the echo from the water-bottom interface (prior intervals are preferably not displayed), and as would be expected is strongest, measured at 1.7 volts at transducer 12. The next interval is less strong (1.1 volts). The next four intervals have echoes at 1.0 volt, 0.8. volt, 0.2 volt, and 0.2 volt respectively. Further intervals contain virtually no echo at all, indicating complete attenuation of the ping. This same information is presented at the bottom of the display in a line labeled "Raw Data:-" which presents the magnitude of each interval's numerical bit weight. In the lower right hand corner of FIG. 3 the water depth is displayed along with the approximate thickness of sediment traversed by the acoustic signal in each time interval.

As returns from the pings arrive, the operator can view the display of FIG. 3 and determine "on the fly" whether any of the system settings need adjustment (37, FIG. 2), e.g. ping repetition interval, transducer gain, interval width, averaging factor, etc., and modify them if necessary (38).

Figure 4:
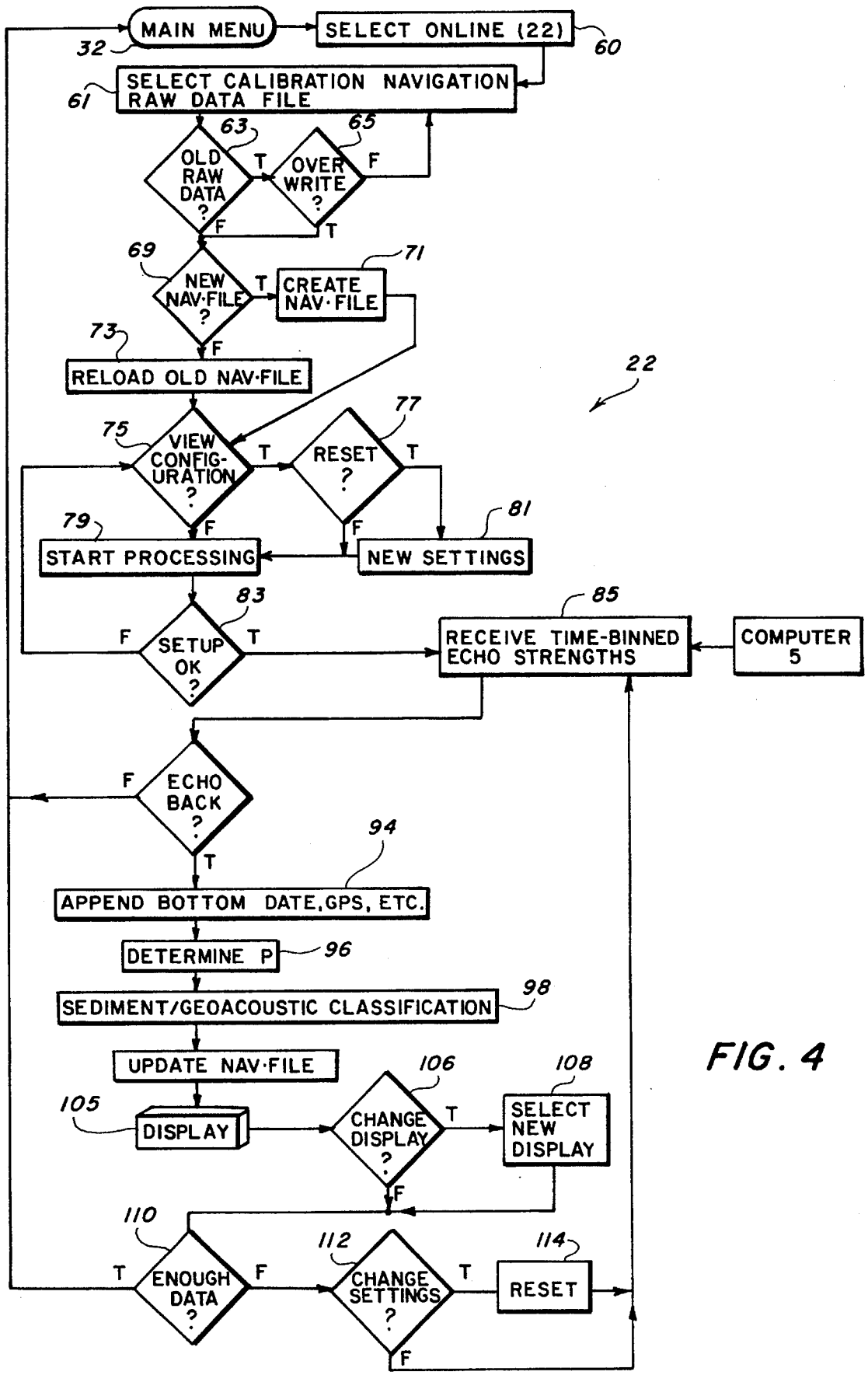
FIG. 4 is a flowchart illustrating operation of the embodiment during data taking.

After determining that the system's initial settings are proper, these data are stored as a calibration file. The operator can then return to the main menu, can select the online software, and commence taking data using the stored calibration file 30. This process is illustrated in the flow chart of FIG. 4. From the main menu, an operator selects online software package 22. The operator selects a calibration file, for use with this particular acquisition of data (61). If the operator has just run initialization software 20, as discussed above, presumably the calibration file developed in it will be used, although the operator can call up from computer memory a list of calibration files previously stored and use any of these to set software processing parameters for the data taking. The operator also selects the name of a raw data file 28 to which the system will write the echo data in computer memory (61), and a navigation file 40 for writing navigation data (61). The online software 22 checks whether an existing raw data file by this name exists (63), warns the operator if one does, and permits the operator to overwrite it (65) y If the operator chooses not to overwrite, the software returns to step 61, permitting the operator to select a new name for the raw data file. Thereafter software 22 similarly queries whether a navigation file exists with the name selected (69). If so, software 22 loads that file (73) so that subsequently generated navigation data can be appended; if not, software 22 creates a new file in computer 10's memory (71). Prior to the commencement of data taking, software 22 permits the operator to view the system configuration (75). If the settings are not correct, the operator can reset them (77, 81). For example, the operator could change the data bit width to match that of digitizer 14's samples to, e.g., six or eight bits, the settings for the navigation display on the graphics screen (more about which following) are adjustable for scale of display as well as latitude and longitude positions of the display, the input serial communications port location where software 22 expects to receive echo strength data, the output serial communications port location where software 22 is to optionally transmit GPS data to auxiliary equipment if in use, and computer 10's address of the GPS receiver board, etc.

Having thus initialized the system, the operator can select the menu option from the keyboard for online software to commence data taking (79). Software 22 checks that all necessary files are identified and accessible (83). If not, software 22 flags an error and sends the operator back to step 75, where the system configuration can be inspected again. Upon software 22 recognizing all settings as correct (or at least not incorrect, i.e. not impossible) and complete, software 22 and begins receiving time sampled echo strength data (85) from the data acquisition computer 5. If software 22 does not receive time sampled echo strength data within a predetermined time, software 22 stops operation and returns the operator to main menu 22.

Figure 5:
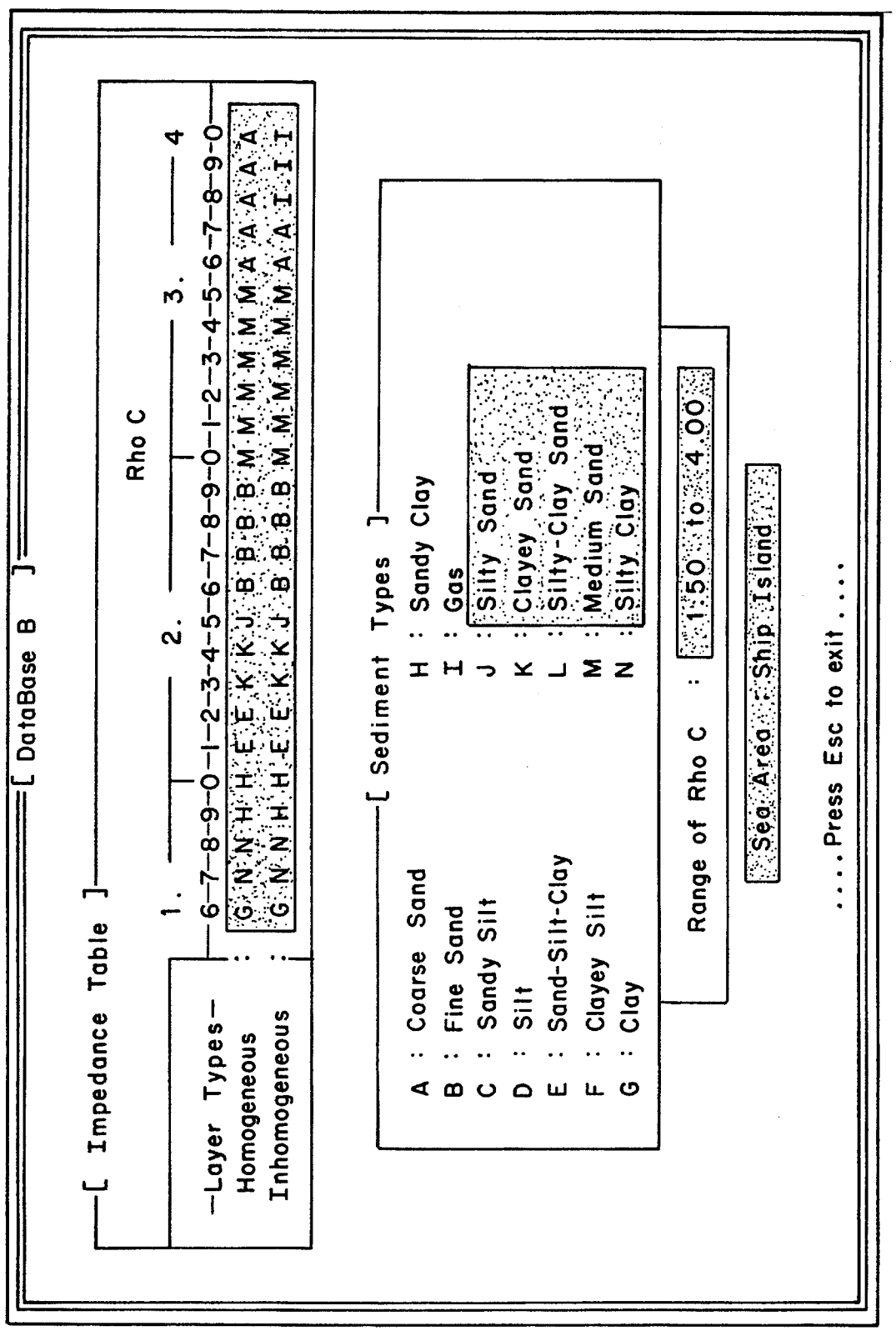
FIG. 5 is a data base correlating acoustic impedance to sediment type used by the embodiment.

For each ping, data acquisition computer 5 converts the returns from digitizer 14 into time series echo strengths, as discussed above, and forwards those echo strengths to computer 10 for processing by online software 22. Software 22 appends to the echo strengths additional information specific to conditions of the particular data acquisition, such as water depth, and sediment interval width, and stores the data into memory in raw data file 28 (94). Software 22 also reads GPS receiver 18 to determine present latitude and longitude, and also appends this information to the raw data, along with the time at which the echo strength measurements were received (94). Software 22 then applies multilayer acoustic sediment theory as set out in the papers of Clay and Medwin, and Lambert, or other appropriate method,-to determine the acoustic impedance ($\rho_c$) of the sediments at depths corresponding to each interval from which transducer 12 received an echo (96). Software 22 then takes these acoustic impedances and uses them to determine the constituents of the sediments which produced the echoes, or to infer any of a number of geoacoustic parameters such as sediment type, attenuation, density, porosity, grain size, sound velocity, and shear strength or other parameters (98). This is done after the manner of Hamilton, by using look up tables in computer memory which correlate acoustic impedance to sediment type, or to these geoacoustic properties; or it is done by using a relationship formula. An example of such data base is shown in FIG. 5. It presents a table correlating acoustic impedance ("Rho C") to "layer type" for both "Homogeneous" and "Inhomogeneous" sediment layers. Given some a priori knowledge of the nature of the sediments under test, and a measured acoustic impedance, one can use the table to look up a coded letter corresponding to a sediment type. For example, and an impedance of 2.6 is associated for both homogeneous and inhomogeneous sediments with the letter "B," which corresponds to "Fine Sand," etc. Data bases of this type were developed by Hamilton. They generally must be produced for different localities and initially verified by taking ground truth core samples. The data base of FIG. 5 is for Ship Island, Miss., which is shallow water data typical of the Gulf of Mexico. Experience indicates that sediments having similar composition are consistent enough from place to place within a region, so that use of one tested data base will likely produce useful results over a wide geographical range. The results of this classification process are stored in memory, ping by ping, time bin by time bin, as sediment property data result files 50 (FIG. 1).

Software 22 will continue receiving data until the operator terminates the process by pressing a pre-defined key on the computer 10's keyboard (not shown), or when computer 10 ceases to receive data. Also, software 22 provides for changing the parameter displayed (steps 106, 108), e.g. from attenuation to sound velocity, ping to ping (steps 110, 112, 114), preferably by provision of an operator hot-key (not shown).

Figure 6:
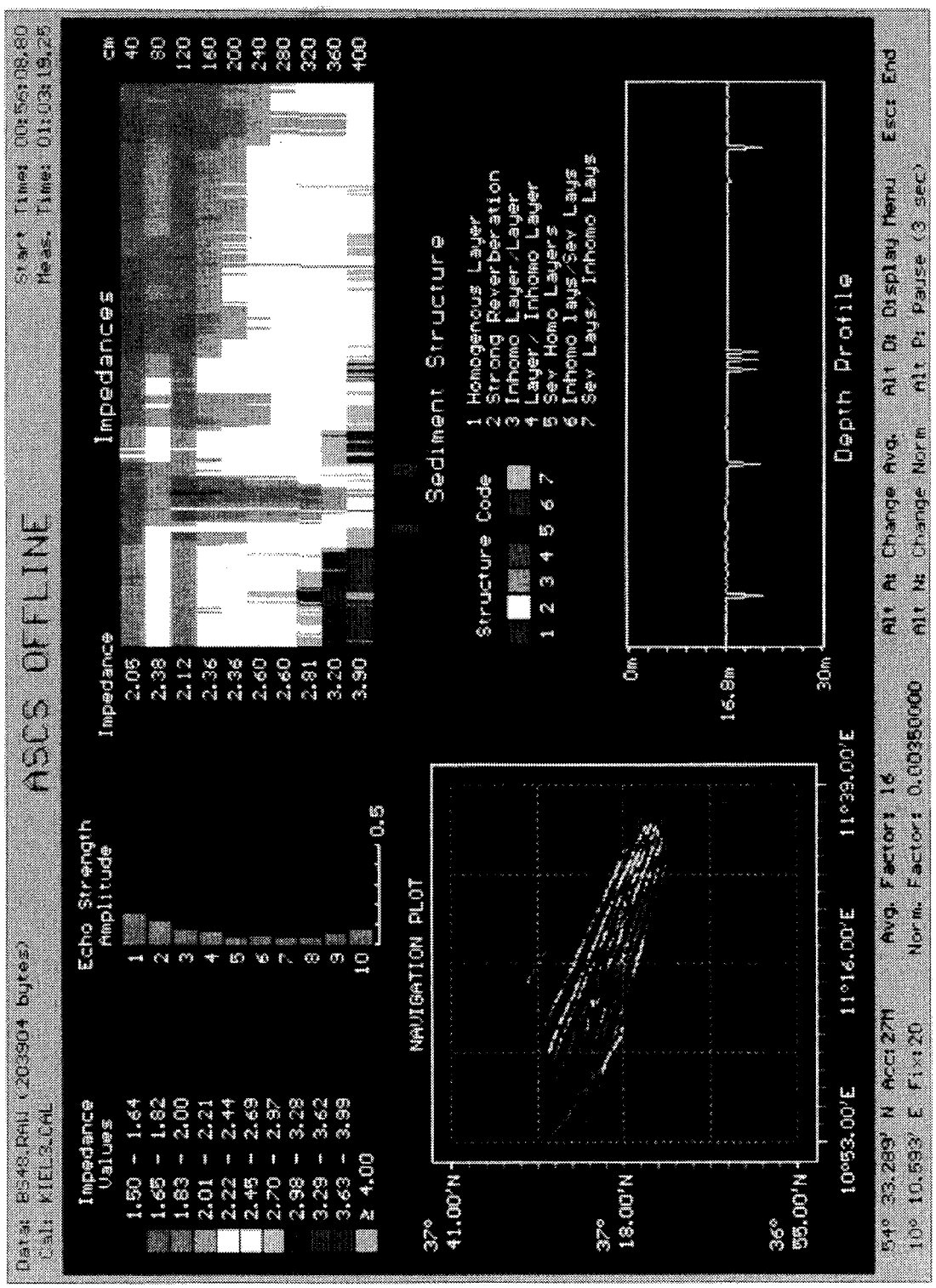
FIG. 6 is a display, such as would preferably occur on a computer monitor screen, which appears during data taking, or later play back of the data.

Preferably, however, the data are displayed as in FIG. 6. In the upper left hand corner of the display are two charts labeled "Impedance Values" and "Echo Strength Amplitudes." The latter is a bar graph, similar to the one in FIG. 3, showing echo strength as a function of interval. The echo strengths in each interval are preferably color coded according to acoustic impedance of the layers to which the interval corresponds. In the upper right hand corner is a scrolling waterfall-type display for the last 288 pings of predicted impedance or any of the other sediment property data (density, porosity, etc.) with a color code for ranges of the value of the property (see color key in upper left corner) with time windowed depth in the sediment. In the lower right hand corner is a plot of water depth (i.e. altitude of transducer 12). In operation, as echo strength data marches through the system, the predicted impedance or sediment property will change on screen 26 according to the predicted parameter value. The data in the two displays on the right hand side of FIG. 6 will scroll horizontally across the screen, most recent data entering at left, least recent exiting at right.

Software 22 also creates (or updates at the operator's discretion) data for navigation file 40 by recording latitude and longitude, and the impedance value determined for the sediment-water interface. FIG. 6 has such a plot, in the lower left hand corner where it would appear on computer monitor 26. The tracklines on the plot represent points of latitude and longitude at which data were taken, and, as is seen in the Figure, tends to resolve into tracklines which follow ship's course during data taking. The navigation plot in FIG. 6 has a plurality of tracklines indicating that the navigation data file from whence came the plot, represents a corresponding plurality of data acquisitions, being updated from one to the next. Bottom impedance is preferably indicated by each datum point in the plot having a color according to a preselected color code, (e.g. each color representing a range of impedance values-see upper left color code key). The range of the plot in latitude and longitude is preferably a default value or a value that the user previously set.

When the data receiving process is complete (110), the software returns to main menu (32). Otherwise, data taking will continue; however, the operator can change parameter settings "on the fly" from ping to ping, or change the display on monitor 26 (to, e.g., present porosity, attenuation, or other geoacoustic property mentioned above, rather than impedance). Thus, for example, if the data as viewed in monitor (105 of FIG. 4) looks flawed because of, e.g., an inappropriate normalization factor or averaging factor, the operator can reset these (114) for subsequent pings. To improve the quality of the sediment classification and display process, time series echo strengths from several consecutive pings are preferably averaged together across corresponding time intervals, as discussed above concerning initialization and calibration software 20. Having data of this kind displayed in near real time makes the system especially valuable as a search tool for locating buried objects. Such objects typically return very noticeable echo signatures-e.g. a markedly stronger return than overlaying sediment-which the operator can spot immediately on the computer 10's monitor 26.

Offline software package 24 (FIG. 1) is almost identical to online software 22, but is designed to permit the replay of data taken earlier, and, although shown in FIG. 1 as loaded into computer 10, could as well be resident in a separate computer, for example in a home-port computer center. Offline software 24 takes for its input a pre-existing raw data file, calibration file, and navigation file, and processes the raw data in the same manner as does online software 22, producing the same monitor display as is shown in FIG. 6.

The output of software 24 is one or more sediment property data files 50, which records, as a function of position, sediment properties (e.g. sediment type, impedance, attenuation, etc., with depth below bottom, as well as water depth below transducer 12).

Software program 70, called "Report" permits an operator to view, edit, print, or export data from files generated by other system software, and preferably is run independent of other system software. It is especially valuable for manipulating huge, multi-megabyte, data files. Its display banners the time ranges of data in the file under view. The operator can jump to various points by keying on time data, and jumping from one time stamp in the file to another. This permits rapid operator movement in the file. Program 70 permits the operator to print a segment of the file, bracketed by times input by the operator. Similarly, the operator can export these file segments formatted for incorporation into other software, e.g. graphics packages, using program 70. For example exported data fields can be delimited by fixed width, commas quotation marks, or other markers required by various target softwares. Program 70 further permits editing of calibration files to permit reprocessing of raw data with the edited calibration files to enable the operator to play "what if" with the data. In a calibration file, the operator can use program 70 to edit a normalization factor, the data averaging factor, and any reference pulse the system may be using. A reference pulse is a series of synthetic echo strengths which the system may subtract from received echoes to correct for system anomalies, e.g. peculiarities in transducer 12.

Navplotr program 80, also a stand alone software package, is an especially useful tool to produce cumulative navigation plots. Program 80 reads latitude and longitude, along with surficial sediment impedance from an existing raw data file, or existing tracklines from an existing navigation file, and displays the cumulative tracklines on the screen for operator inspection. This program is especially useful in planning, and executing, large surveys, or in conducting bottom searches (e.g., if one is searching a large surficial sand field as a source of beach replenishment, and the operator finds that an area largely covered by silt has been surveyed, the operator could then decide to continue the search elsewhere).

ASCS2CPS software 180 is especially useful for formatting data for commercial contour mapping packages. Program 180 reads multiple result files, i.e. ones which include sediment properties and navigation data (latitude, longitude, and all time binned impedance data), and displays the navigation data on screen. Using the keyboard cursor, an operator can draw a box around a desired area, and can command the result data inscribed within to be exported for map development. This program is especially useful in that it can process data over a larger geographical area than could be accommodated by one file.

As mentioned above, the system preferably infers various geoacoustic properties of sediments by reference to look-up tables relating the properties to acoustic impedance. The following are such tables for the vicinity of Ship Island, Miss.:

| Attenuation dB/lambda | | Impedance = 100 * gm/s/cm^2 | |
|---|---|---|---|
| Impedance | Attenuation | Impedance | Attenuation |
| 1.55 | 0.054 | 2.80 | 0.478 |
| 1.60 | 0.059 | 2.85 | 0.540 |
| 1.65 | 0.065 | 2.90 | 0.602 |
| 1.70 | 0.070 | 2.95 | 0.662 |
| 1.75 | 0.075 | 3.00 | 0.722 |
| 1.80 | 0.080 | 3.05 | 0.781 |
| 1.86 | 0.084 | 3.10 | 0.749 |
| 1.90 | 0.089 | 3.25 | 0.688 |
| 1.95 | 0.093 | 3.20 | 0.627 |
| 2.00 | 0.098 | 3.25 | 0.567 |
| 2.05 | 0.102 | 3.30 | 0.518 |
| 2.20 | 0.106 | 3.33 | 0.512 |
| 2.13 | 0.110 | 3.40 | 0.506 |
| 2.20 | 0.114 | 3.45 | 0.500 |
| 2.25 | 0.218 | 3.50 | 0.494 |
| 2.30 | 0.122 | 3.55 | 0.488 |
| 2.35 | 0.125 | 3.60 | 0.482 |
| 2.40 | 0.129 | 3.65 | 0.476 |
| 2.45 | 0.133 | 3.70 | 0.470 |
| 2.50 | 0.136 | 3.75 | 0.465 |
| 2.55 | 0.133 | 3.80 | 0.459 |
| 2.60 | 0.222 | 3.83 | 0.454 |
| 2.63 | 0.287 | 3.90 | 0.448 |
| 2.70 | 0.352 | 3.95 | 0.441 |
| 2.75 | 0.416 | 4.00 | 0.433 |

| Density gm/cm^3 | | Impedance = 100 * gm/s/cm^2 | |
|---|---|---|---|
| Impedance | Density | Impedance | Density |
| 1.55 | 1.20 | 2.80 | 1.72 |
| 1.60 | 1.12 | 2.85 | 1.74 |
| 1.65 | 1.14 | 2.90 | 1.76 |
| 1.70 | 1.16 | 2.93 | 1.78 |
| 1.75 | 1.18 | 3.00 | 1.80 |
| 1.80 | 1.20 | 3.05 | 1.82 |
| 1.85 | 1.21 | 3.10 | 1.84 |
| 2.90 | 1.23 | 3.15 | 2.86 |
| 1.95 | 1.27 | 3.20 | 1.88 |
| 2.00 | 1.32 | 3.25 | 1.90 |
| 2.05 | 1.34 | 3.30 | 1.92 |
| 2.10 | 1.37 | 3.35 | 1.93 |
| 2.15 | 1.40 | 3.40 | 1.95 |
| 2.20 | 2.43 | 3.45 | 1.97 |
| 2.25 | 1.46 | 3.50 | 1.98 |
| 2.30 | 1.49 | 3.55 | 2.00 |
| 2.35 | 1.51 | 3.60 | 2.02 |
| 2.40 | 1.54 | 3.65 | 2.03 |
| 2.46 | 1.57 | 3.70 | 2.05 |
| 2.50 | 1.59 | 3.75 | 2.06 |
| 2.55 | 1.61 | 3.80 | 2.08 |
| 2.60 | 1.64 | 3.85 | 2.09 |
| 2.65 | 2.66 | 3.90 | 2.11 |
| 2.70 | 1.68 | 3.95 | 2.23 |
| 2.75 | 1.70 | 4.00 | 2.14 |

| Porosity = % | | Impedance = 100 * gm/s/cm^2 | |
|---|---|---|---|
| Impedance | Porosity | Impedance | Porosity |
| 1.55 | 96.10 | 2.80 | 44.86 |
| 1.60 | 92.04 | 2.85 | 43.74 |
| 1.65 | 89.07 | 2.90 | 42.68 |
| 1.70 | 86.22 | 2.95 | 41.66 |
| 1.75 | 83.46 | 3.00 | 40.68 |
| 1.80 | 80.80 | 3.05 | 39.75 |
| 1.90 | 79.24 | 3.10 | 38.85 |
| 1.90 | 75.77 | 3.15 | 38.00 |
| 1.95 | 73.40 | 3.20 | 37.17 |
| 2.00 | 71.11 | 3.25 | 36.38 |
| 2.05 | 68.92 | 3.30 | 35.62 |
| 2.10 | 66.80 | 3.35 | 34.89 |
| 2.15 | 64.77 | 3.40 | 34.18 |
| 2.20 | 62.82 | 3.45 | 33.49 |
| 2.25 | 60.95 | 3.50 | 32.83 |
| 2.30 | 59.16 | 3.55 | 32.18 |
| 2.35 | 57.44 | 3.60 | 31.56 |
| 2.40 | 55.78 | 3.65 | 30.94 |
| 2.45 | 54.20 | 3.70 | 30.34 |
| 2.50 | 52.68 | 3.75 | 29.74 |
| 2.55 | 51.23 | 3.80 | 29.16 |
| 2.60 | 49.84 | 3.85 | 28.57 |
| 2.65 | 48.51 | 3.90 | 27.99 |
| 2.70 | 47.24 | 3.95 | 27.41 |
| 2.75 | 46.02 | 4.00 | 26.83 |

| Grain Size = Phi | | Impedance = 100 * gm/s/cm 2 | |
|---|---|---|---|
| Impedance | Grain Size | Impedance | Grain Size |
| 1.55 | 9.30 | 2.80 | 2.34 |
| 1.60 | 8.73 | 2.85 | 2.25 |
| 1.65 | 8.20 | 2.90 | 2.16 |
| 1.70 | 7.69 | 2.95 | 2.07 |
| 1.75 | 7.22 | 3.00 | 1.98 |
| 1.80 | 6.78 | 3.05 | 1.90 |
| 1.85 | 6.37 | 3.10 | 1.81 |
| 1.90 | 5.98 | 3.15 | 1.72 |
| 1.95 | 5.62 | 3.20 | 1.62 |
| 2.00 | 5.29 | 3.25 | 1.52 |
| 2.05 | 4.98 | 3.30 | 1.42 |
| 2.10 | 4.69 | 3.35 | 1.30 |
| 2.15 | 4.42 | 3.40 | 1.18 |
| 2.20 | 4.17 | 3.45 | 1.05 |
| 2.25 | 3.94 | 3.50 | 0.91 |
| 2.30 | 3.73 | 3.55 | 0.76 |
| 2.35 | 3.54 | 3.60 | 0.59 |
| 2.40 | 3.36 | 3.65 | 0.41 |
| 2.45 | 3.20 | 3.70 | 0.22 |
| 2.50 | 3.05 | 3.75 | 0.00 |
| 2.55 | 2.91 | 3.80 | −0.23 |
| 2.60 | 2.78 | 3.85 | −0.48 |
| 2.65 | 2.66 | 3.90 | −0.75 |
| 2.70 | 2.54 | 3.95 | −1.04 |
| 2.75 | 2.44 | 4.00 | −1.35 |

| Sound Velocity = m/sec | | Impedance = 100 * gm/s/cm^2 | |
|---|---|---|---|
| Impedance | Sound Velocity | Impedance | Sound Volocity |
| 1.55 | 1492 | 2.80 | 1764 |
| 1.60 | 1505 | 2.85 | 1773 |
| 1.65 | Isis | 2.90 | 1782 |
| 1.70 | 1522 | 2.95 | 1789 |
| 1.75 | 1528 | 3.00 | 1796 |
| 1.80 | 1534 | 3.05 | 1801 |

-continued

| | | | |
|---|---|---|---|
| 1.85 | 1539 | 3.10 | 1805 |
| 1.90 | 1645 | 3.15 | 1808 |
| 1.95 | 1561 | 3.20 | 1811 |
| 2.00 | 1558 | 3.25 | 1813 |
| 2.05 | 1567 | 3.30 | 1825 |
| 2.10 | 1576 | 3.35 | 1816 |
| 2.15 | 1587 | 3.40 | 1818 |
| 2.20 | 1599 | 3.45 | 1819 |
| 2.25 | 1612 | 3.50 | 1821 |
| 2.30 | 2626 | 3.55 | 1824 |
| 2.35 | 1640 | 3.60 | 1827 |
| 2.40 | 1655 | 3.65 | 1830 |
| 2.45 | 1670 | 3.70 | 1834 |
| 2.50 | 1685 | 3.75 | 1839 |
| 2.55 | 1700 | 3.80 | 1843 |
| 2.60 | 1714 | 3.85 | 1846 |
| 2.65 | 1728 | 3.90 | 1848 |
| 2.70 | 1740 | 3.95 | 1848 |
| 2.75 | 1753 | 4.00 | 1845 |

| Shear Strength = $gm/cm^2$ | | Impedance = $100 * gm/s/cm^2$ | |
|---|---|---|---|
| Impodance | Shear Strength | Impedance | Shear Strength |
| 1.55 | 11.45 | 2.80 | 121.34 |
| 1.60 | 12.48 | 2.85 | 132.06 |
| 1.65 | 13.65 | 2.90 | 143.55 |
| 1.70 | 14.97 | 2.95 | 155.86 |
| 1.75 | 16.45 | 3.00 | 169.03 |
| 1.80 | 18.12 | 3.05 | 183.10 |
| 1.85 | 19.99 | 3.10 | 198.12 |
| 1.90 | 22.07 | 3.15 | 214.14 |
| 2.95 | 24.38 | 3.20 | 231.20 |
| 2.00 | 26.94 | 3.25 | 249.35 |
| 2.05 | 29.78 | 3.30 | 268.65 |
| 2.10 | 32.90 | 3.35 | 282.24 |
| 2.15 | 36.34 | 3.40 | 310.89 |
| 2.20 | 40.11 | 3.45 | 333.94 |
| 2.25 | 44.24 | 3.50 | 358.36 |
| 2.30 | 48.76 | 3.55 | 384.21 |
| 2.35 | 53.68 | 3.60 | 412.64 |
| 2.40 | 59.04 | 3.65 | 440.43 |
| 2.45 | 64.87 | 3.70 | 470.92 |
| 2.50 | 71.20 | 3.75 | 503.08 |
| 2.56 | 79.05 | 3.80 | 537.00 |
| 2.60 | 85.45 | 3.85 | 672.74 |
| 2.65 | 93.45 | 3.90 | 620.36 |
| 2.70 | 102.08 | 3.95 | 649.95 |
| 2.75 | 111.36 | 4.00 | 691.57 |

The invention has been described in what is considered to be the most practical and preferred embodiments. It is recognized, however, that obvious modifications to these embodiments may occur to those with skill in this art. Accordingly, the scope of the invention is to be discerned solely by reference to the appended claims, wherein:

We claim:

1. A method effective for investigating marine sediment, comprising:

(a) launching an acoustic ping into the water column above said sediment;

(b) receiving echoes of said ping;

(c) digitally sampling said echoes;

(d) partitioning said samples according to a preselected number of time intervals following said launching;

(e) for each of said intervals: using ones of said samples partitioned into said each of said intervals for estimating the echo strength magnitude of said echoes during said each of said intervals to produce a plurality of echo strength magnitudes corresponding to said intervals;

storing said plurality of echo strength magnitudes in computer memory;

using said echo strength magnitudes to generate information sufficient to estimate the sediment corresponding to said time intervals; and associating said information in computer memory with said echo strength magnitudes;

wherein said method further comprises repeating steps (a)-(e) one or more times.

2. The method of claim 1, further comprising displaying one or more of said plurality of said echo strength magnitudes on a computer monitor effective for human viewing in near real time.

3. The method of claim 1, further comprising:

recording said echo strength magnitudes in computer memory as an echo-strength record for said ping; and associating with said echo-strength record the latitude and longitude at which said receiving of said echoes occurred.

4. The method of claim 1 using said echo strength wherein said information is acoustic impedance of the sediment associated with a corresponding one of said each of said intervals.

5. The method of claim 4, further comprising displaying said acoustic impedance of the sediment associated with said corresponding one of said each of said intervals on a computer monitor effective for human viewing in near real time.

6. The method of claim 4, further comprising:

using said acoustic impedance of the sediment associated with said corresponding one of said each of said intervals to predict the material constituting said sediment associated with said each of said intervals.

7. The method of claim 6, further comprising displaying the predicted material constituting said sediment associated with said each of said intervals on a computer monitor effective for human viewing in near real time.

8. The method of claim 6, further comprising:

associating in said computer memory with said plurality of echo strength magnitudes the predicted material constituting said sediment associated with corresponding ones of said each of said intervals.

9. The method of claim 4, further comprising:

using said acoustic impedance of the sediment associated with said corresponding one of said each of said intervals to predict a selected geoacoustic parameter of said sediment associated with said each of said intervals.

10. The method of claim 9, further comprising displaying said selected geoacoustic parameter on a computer monitor effective for human viewing in near real time.

11. The method of claim 9, said information comprises the predicted value of said selected geoacoustic parameter of said sediment associated with said each of said intervals.

12. The method of claim 11, wherein said selected geoacoustic parameter is a member of the group consisting of: attenuation, acoustic velocity, shear strength, porosity, and grain size.

13. The method of claim 6, further comprising associating in said computer memory said plurality of echo strength magnitudes and the latitude and longitude at which said receiving of said echoes occurred.

14. The method of claim 13, further comprising displaying on a computer monitor a latitude and longitude plot of where said receiving occurred.

15. An apparatus for investigating marine sediment, comprising:

(a) means for launching an acoustic ping into the water column above said sediment;

(b) means for receiving echoes of said ping;

(c) means for digitally sampling said echoes;

(d) means for partitioning said samples according to a preselected number of time intervals following said launching;

(e) means, for each of said intervals, for using ones of said samples partitioned into said each of said intervals for estimating the echo strength magnitude of said echoes during said each of said intervals to produce a plurality of echo strength magnitudes corresponding to said intervals;

means for storing said plurality of echo strength magnitudes in computer memory;

means for using said echo strength magnitudes to generate information sufficient to estimate the sediment corresponding to said time intervals; and means for associating said information in computer memory with said echo strength magnitudes.;

wherein said apparatus further comprises means for causing said means for launching to launch at least one additional ping.

16. The apparatus of claim 15 wherein said means for using said echo strength magnitudes causes said information to be acoustic impedance of the sediment associated with a corresponding one of said each of said intervals.

17. The apparatus of claim 16 wherein said means for using said echo strength magnitudes causes said information to be acoustic impedance of the sediment associated with a corresponding one of said each of said intervals.

18. The method of claim 17, further comprising means for associating in said computer memory said plurality of echo strength magnitudes and the latitude and longitude at which said receiving of said echoes occurred.

19. The apparatus of claim 17, further comprising:

means for using said acoustic impedance of the sediment associated with said corresponding one of said each of said intervals to predict a selected geoacoustic parameter of said sediment associated with said each of said intervals.

20. The apparatus of claim 19, wherein:

said means for using said echo strength magnitudes causes said information to comprise the predicted value of said selected geoacoustic parameter of said sediment associated with said each of said intervals; and said selected geoacoustic parameter is a member of the group consisting of: attenuation, acoustic velocity, shear strength, porosity, and grain size.

* * * * *